United States Patent [19]

Fenton

[11] Patent Number: 4,986,844
[45] Date of Patent: Jan. 22, 1991

[54] GLASSWARE FORMING MACHINE OF THE INDIVIDUAL SECTION TYPE

[75] Inventor: Frank A. Fenton, Granby, Conn.

[73] Assignee: Emhart Industries, Inc., Towson, Md.

[21] Appl. No.: 352,222

[22] Filed: May 15, 1989

[30] Foreign Application Priority Data

May 27, 1988 [GB] United Kingdom ............... 8812626

[51] Int. Cl.$^5$ ..................... C03B 9/16; C03B 9/193
[52] U.S. Cl. ................................. 65/229; 65/235; 65/241
[58] Field of Search ............... 65/235, 232, 229, 241, 65/260, 304, 323, 165

[56] References Cited

U.S. PATENT DOCUMENTS

| | | | |
|---|---|---|---|
| 3,472,642 | 10/1969 | Irwin | 65/323 |
| 3,617,233 | 11/1971 | Mumford | 65/235 X |
| 3,672,860 | 6/1972 | Keller | 65/304 X |
| 4,004,906 | 1/1977 | Rowe | 65/229 |
| 4,009,018 | 2/1977 | Nebelung et al. | 65/229 |
| 4,010,021 | 3/1977 | Foster | 65/229 |
| 4,137,061 | 1/1979 | Mallory et al. | 65/232 |
| 4,612,032 | 9/1986 | Nebelung | 65/165 |
| 4,655,813 | 4/1987 | Nebelung | 65/165 |

Primary Examiner—Joye L. Woodard
Attorney, Agent, or Firm—Spencer T. Smith

[57] ABSTRACT

Each section (10) of the machine comprises a parison moulding apparatus (12), a final moulding apparatus (14) and an invert mechanism (16). The invert mechanism is driven by a servo-motor (108) connected to a gear (100, 102) secured to an end portion of a neck ring support (90, 92) of the invert mechanism away from the center-line of the section. The baffle mechansim (32) of the parison moulding apparatus (12) is mounted on an overhead structure (22) and the mould portions (62) of the final moulding apparatus (14) are moved in a straight line to open and close the moulds. By these measures, the center-line of the section (10) is cleared enabling the radius of the invert mechanism (16) to be reduced.

2 Claims, 4 Drawing Sheets

Fig_1

Fig_2

GLASSWARE FORMING MACHINE OF THE INDIVIDUAL SECTION TYPE

BACKGROUND OF THE INVENTION

This invention is concerned with glassware forming machines of the individual section type.

The individual section type of glassware forming machine is well known and is described in U.S. Pat. No. 1,911,119. A machine of this type manufactures glass containers from gobs of molten glass and has a number of sections each of which receives gobs from the same source and deposits completed containers on the same conveyors. The sections receive gobs in turn and operate identically but with phase differences between them.

Each section of an individual section type machine comprises a section frame on which the various mechanisms of the section are supported, the frame being in the form of a box whose top forms a table on which some mechanisms are supported and in holes in which other mechanisms are mounted. Each section comprises a parison moulding apparatus operable to mould gobs of molten glass supplied to the section into parisons, which term is used for an intermediate shape between a gob and a completed container. A parison moulding apparatus conventionally comprises a pivot pin on which two blank mould supporting arms are mounted for pivoting motion towards or away from one another. Each arm supports at least one mould side portion and movement of the arms brings opposed side portions into engagement to define a mould cavity in which a parison can be moulded or into a separated condition to allow removal of parisons. A plunger mechanism is mounted beneath each blank mould to move a plunger into or out of the mould cavity. A baffle mechanism is operable to move a baffle into position on a mould to close the top thereof and in most cases a funnel mechanism is provided to move a gob guiding funnel into position to guide a gob into the mould cavity and then to remove the funnel from the path of the baffle.

Each section also comprises a final moulding apparatus operable to mould parisons formed by the parison moulding apparatus into glassware containers. Conventionally, a final moulding apparatus comprises a pivot pin on which two final mould supporting arms are mounted for pivoting motion towards or away from one another. Each arm supports at least one mould side portion and movement of the arms brings opposed side portions into engagement to define a mould cavity around a parison which can then be moulded in the cavity or into a separated condition to allow removal of a container and introduction of a further parison. The final moulding apparatus also comprises a bottom plate forming the bottom of the mould cavity and a blowhead mechanism operable to place a blowhead on a parison in a mould cavity so that air blown into the parison through the blowhead causes the parison to expand to the shape of the mould cavity.

Each section also comprises an invert mechanism operable to move parisons arcuately about a horizontal axis to transfer them from the parison moulding apparatus to the final moulding apparatus. A conventional invert mechanism comprises a neck ring support mounted to turn back and forth about said horizontal axis to move parison-gripping neck rings mounted thereon between the parison moulding apparatus and the final moulding apparatus, and drive means operable to turn the neck ring support as aforesaid. The neck rings are arranged to form a neck portion of the mould cavity of the parison moulding apparatus, to support the parison when the mould opens, and to support the parison during its arcuate movement to the final moulding apparatus and then release it into the mould of the final moulding apparatus. The drive means of an invert mechanism conventionally comprises a gear centrally mounted on the neck ring support, i.e. on the centre line of the section, and a vertically-disposed piston and cylinder assembly operable to move a rack meshed with the gear to move the neck ring support arcuately as aforesaid.

In a conventional section, the pivot pin for the blank mould supporting arms, the plunger mechanism, the piston and cylinder of the invert mechanism with its rack, and the pivot pin for the final mould supporting arms are all supported on the centre line of the section. The baffle mechanism and any funnel mechanism are supported by the top of the section frame away from the centre line but project close to said centre line. The blowhead mechanism is supported by an overhead structure of the section.

In a conventional individual section machine section, the mean radius of the invert mechanism is 12 inches (30.5 cms) for a 4.25 inch (10.8 cms) machine, i.e. the distance from the axis of the invert mechanism to the central point of two blank or final moulds spaced with their centres 4.25 inches apart is 12 inches. Some 4.5 inches (10.4 cms) of this 12 inches is occupied by the moulds and the remainder is required to clear the baffle mechanism, any funnel mechanism, and the piston and cylinder assembly of the invert mechanism with its rack (on the one side of the axis), and the pivot pin of the final mould supporting arms (on the other side of the axis).

SUMMARY OF THE INVENTION

It is an object of the present invention to provide an individual section machine in which the mean invert radius of the invert mechanism can be reduced from that of a conventional machine.

The invention provides a glassware forming machine of the individual section type wherein each section comprises a parison moulding apparatus operable to mould gobs of molten glass supplied to the section into parisons, a final moulding apparatus operable to mould parisons into glassware containers, and an invert mechanism operable to move parisons arcuately about a horizontal axis to transfer them from the parison moulding apparatus to the final moulding apparatus, the invert mechanism comprising a neck ring support mounted to turn back and forth about said horizontal axis to move parison-gripping neck rings mounted thereon between the parison moulding apparatus and the final moulding apparatus, and drive means operable to turn the neck ring support as aforesaid, the drive means comprising gear means secured to an end portion of said neck ring support away from the centre line of the section and servo-motor means connected to said gear means, the parison moulding apparatus having its baffle mechanism and any funnel mechanism mounted on an overhead structure of the section above the mould or moulds thereof, and the final moulding apparatus comprising two mould supporting arms which are mounted for movement in a straight line towards or away from one another.

In a glassware forming machine according to the last preceding paragraph, the drive means of the invert mechanism is at the edge of the section rather than on the centre line of the section, the baffle mechanism and any funnel mechanism are removed from the section frame to an overhead structure, and the mould supporting arms of the final moulding apparatus have no pivot pin. All these items are thus removed from the space between the moulds of the blank moulding apparatus and the moulds of the final moulding apparatus so that these moulds can be moved closer together and the mean invert radius can accordingly be reduced. This enables the overall section length to be reduced increasing access. Furthermore, the reduction in radius enables the speed of the invert mechanism to be increased without increasing the centrifugal force on the parisons. For example, if the radius is reduced from 12 inches (30.5 cms) to 9 inches (22.9 cms), the speed can be increased by approximately 15 percent. It is also possible to provide a hole through the section frame to a basement to allow cullet removal, e.g. defective parisons could be dropped down the hole without entering the final moulding apparatus.

Advantageously, the parison moulding apparatus may also comprise two mould supporting arms which are mounted for movement in a straight line towards or away from one another. This arrangement removes the pivot pin of the parison moulding apparatus from the centre line of the section thereby creating a "tunnel" through the section which would assist cullet clearance.

There now follows a detailed description, to be read with reference to the accompanying drawings of a glassware forming machine which is illustrative of the invention. It is to be understood that the illustrative machine has been selected for description by way of example and not of limitation of the invention.

DETAILED DESCRIPTION OF AN EMBODIMENT

Figure 1:
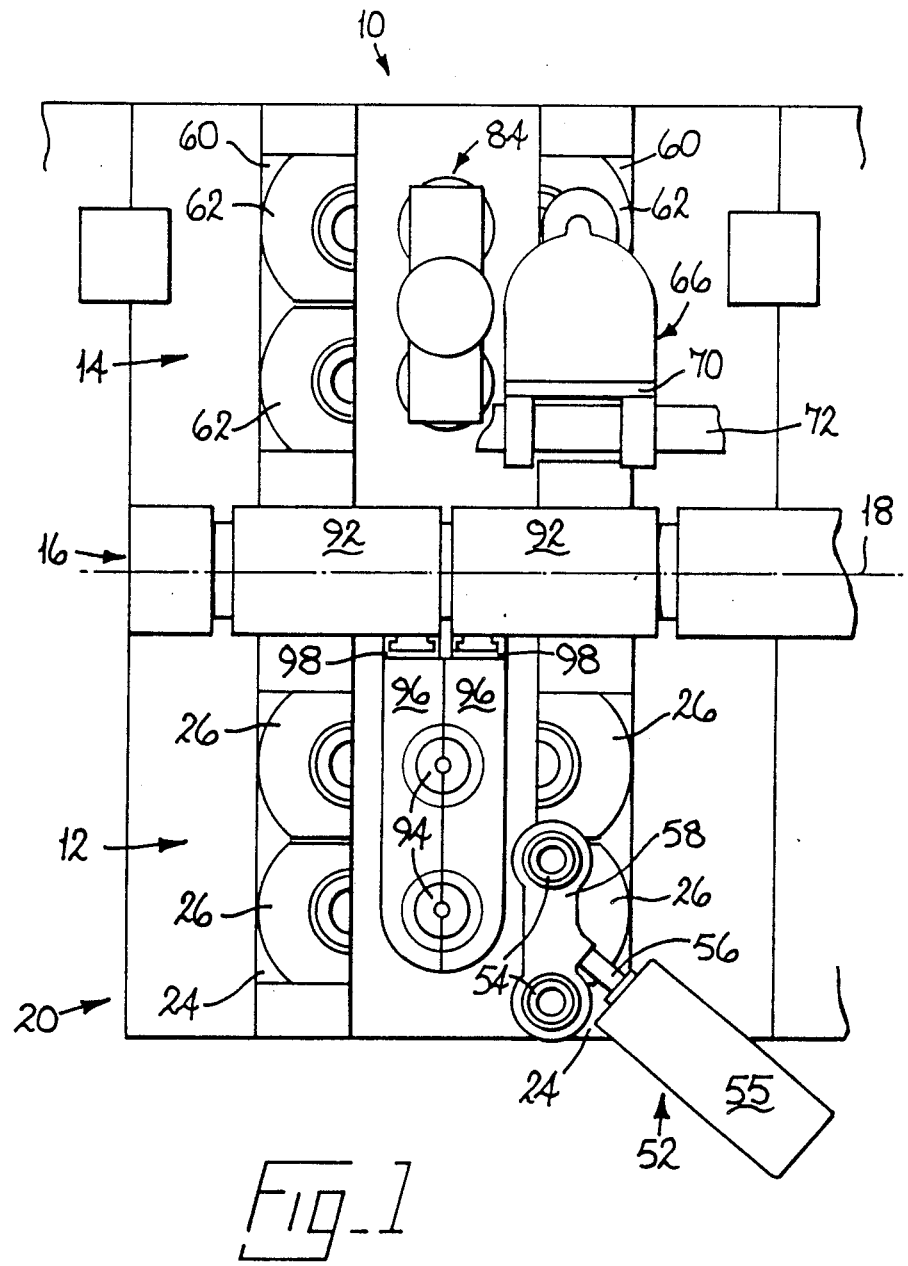
FIG. 1 is a plan view of a section of the illustrative machine with the baffle mechanism thereof omitted.

The illustrative glassware forming machine is of the individual section type and comprises a plurality of sections 10, one of which is illustrated in the drawings. Each section 10 comprises a parison moulding apparatus 12 operable to mould gobs of molten glass supplied to the section into parisons. Each section 10 also comprises a final moulding apparatus 14 operable to mould parisons moulded by the parison moulding apparatus into glassware containers. Each section 10 also comprises an invert mechanism 16 operable to move parisons arcuately about a horizontal axis 18 to transfer them from the parison moulding apparatus 12 to the final moulding apparatus 14. The apparatuses 12 and 14 are supported partly on a box-like frame 20 which rests on a base 21 on the floor and partly on an overhead structure 22 which consists of rods (to be described) which extend transversely above all the sections 10 and are supported by end columns (not shown) of the machine.

The parison moulding apparatus 12 comprises two blank mould supporting arms 24 which are mounted for motion towards or away from one another in a straight line to bring mould side portions 26 supported by the arms 24 into mould closed conditions in which each side portion 26 engages a portion 26 on the other arm 24 to define a mould cavity in which parisons can be moulded, or mould open conditions (shown in FIG. 1) in which the portions 26 are separated to allow removal of parisons. The arms 24 are mounted and moved in accordance with the arrangement described in European Patent Specification No. 0 059 573, i.e. each arm 24 is mounted on a linear slide and is pivotally connected to the upper end of a lever (not shown) which is pivoted about a horizontal axis by a vertically-disposed piston and cylinder assembly (not shown) mounted within the frame 20. The arms 24 are illustrated supporting two mould side portions 26 but any suitable number may be supported.

The mould side portions 26 are provided with mould cooling generally similar to that described in European Patent Specification No. 0 153 534 comprising a plenum chamber 25 projecting over each mould side portion 26 on an arm 24 to supply cooling air to passages (not shown) in the side portions 26, and a supply pipe 27.

Figure 2:
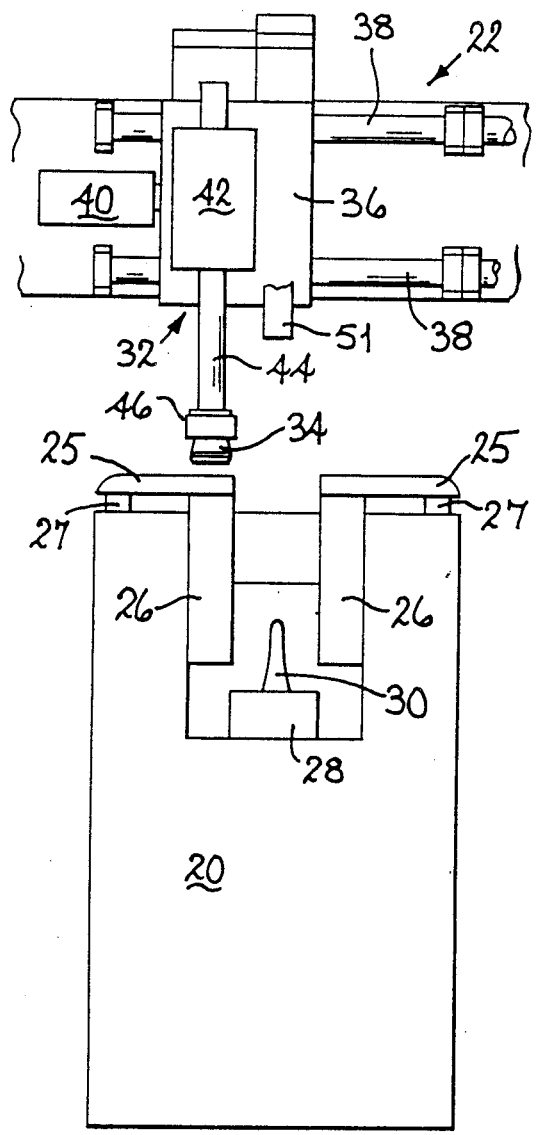
FIG. 2 is an end elevational view of the section.

The parison moulding apparatus 12 also comprises a plunger mechanism 28 (see FIG. 2) mounted within the frame 20 beneath the position occupied by the mould portions 26 when in their closed condition, i.e., on the centre-line of the section 10. The plunger mechanism 28 is thus mounted beneath each blank mould and is operable to move a plunger 30 into or out of the mould cavity of each blank mould. The plunger mechanism 28 is of conventional construction and is used in the conventional manner to move a plunger for blow moulding or press moulding or parison.

Figure 3:
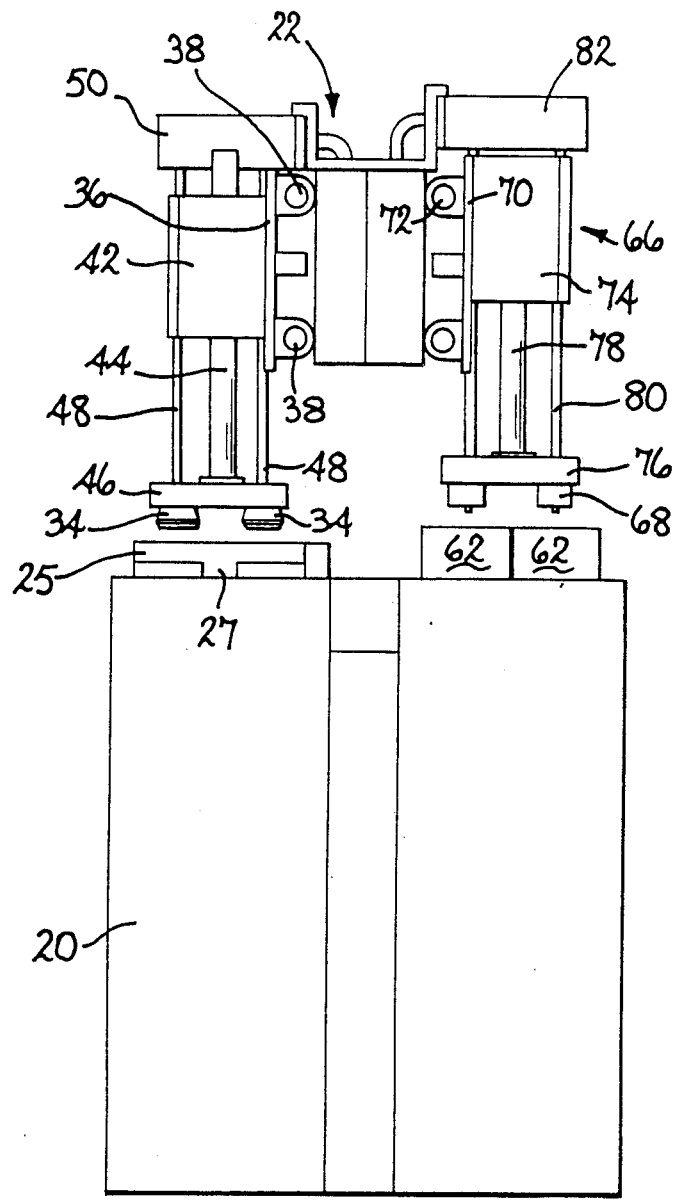
FIG. 3 is a side elevational view of the section with the invert mechanism omitted.

The parison moulding apparatus also comprises a baffle mechanism 32 operable to move two baffles 34 (FIG. 2) into position on the moulds 26 to close the tops thereof. The baffle mechanism 32 is mounted on the overhead structure 22 of the section 10 above the moulds 26. The mechanism 32 comprises a carriage 36 which is slidable on two horizontal rods 38 of the structure 22 which extend one above the other transversely of the section 10, a horizontally-disposed piston and cylinder assembly 40 mounted on the structure 22 and operable to slide the carriage 36 along the rods 38 between an operative position in which the baffles 34 are above the centre-line of the section 10 and an out-of-the-way position (shown in FIG. 2) above the mould-open position of one of the arms 24 in which the baffles 34 are displaced from the centre-line of the section 10, and a vertically-disposed piston and cylinder assembly 42 mounted on the carriage 36 and operable to raise and lower the baffles 34 towards or away from the moulds to position the baffles on top of the moulds or remove them therefrom. The piston rod 44 of the assembly 42 supports a holder 46 (see FIG. 3) which extends parallel to the centre-line of the section 10 and supports a baffle 34 at each end thereof. Thus, the baffle mechanism 32 comprises a carriage 36 mounted for horizontal movement transversely of the section 10 along the rods 38 to bring each baffle 34 into vertical alignment with a blank mould 26 and means 42 for raising or lowering the baffle towards the mould. The operations of the assemblies 40 and 42 may overlap to increase operating speed. An air supply to the baffles 34, which is necessary if the parison is to be formed by blowing is provided by two telescopic tubes 48 extending parallel to the piston rod 44 and connecting a source of air 50 on the structure 22 to the holder 46. The carriage 36 also carries gob deflectors 51 to guide gobs towards the moulds.

The parison moulding apparatus 12 also comprises a funnel mechanism 52 (FIG. 1) operable to move two gob guiding funnels 54 into and out of position to guide gobs into the mould cavities formed by the mould side portions 26. The funnel mechanism 52 comprises a horizontally-disposed piston and cylinder assembly 55 mounted on the overhead structure 22 at the end of the section 10 and has a piston rod 56 extending towards the intersection point of the centre-line of the section 10 and a line extending transversely of the section 10 halfway between the moulds 26. The piston rod 56 supports a holder 58 which supports the funnels 54. The assembly 55 is operable to move the funnels 54 horizontally between an operative position above the moulds 26 and an out-of-the-way position (shown in FIG. 1) above one of the mould portions 26 in its mould open condition.

The final moulding apparatus 14 of the section 10 comprises two final mould supporting arms 60 which are mounted for motion towards or away from one another in a straight line in similar manner to the arms 24, i.e. the arms 60 are mounted in similar manner to that described in European Patent Specification No. 0 059 573. Mould side portions 62 are supported by the arms 60 so that the motion of the arms brings each side portion 62 into a mould closed condition in which it engages a side portion 62 on the other arm 60 and cooperates therewith in forming a mould cavity in which a parison can be moulded into a container, or into a mould open condition (shown in FIG. 1) in which the mould side portions 62 are separated to allow removal of articles and introduction of further parisons. In their mould closed conditions, the side portions 62 also engage bottom plates (not shown) mounted in the frame 20 which cooperate in defining the mould cavities.

The final moulding apparatus also comprises a blowhead mechanism 66 operable to place a blowhead 68 on a parison in a mould cavity formed by the side portions 62 so that air blown into the parison through the blowhead 68 causes the parison to expand to the shape of the mould cavity. The blowhead mechanism 66 is mounted on the overhead structure 22 of the section 10 above the moulds 62. The mechanism 66 comprises a carriage 70 which is slidable on two horizontal rods 72 of the structure 22 which extend one above the other transversely of the section 10, a horizontally-disposed piston and cylinder assembly (not shown) mounted on the structure 22 and operable to slide the carriage 70 along the rods 72 between an operative position in which the blowheads 68 are above the centre-line of the section 10 and an out-of-the-way position (shown in FIG. 1) above the mould-open position of one of the arms 60 in which the blowheads are displaced from the centre-line of the section 10, and a vertically-disposed piston and cylinder assembly 74 (FIG. 3) mounted on the carriage 70 and operable to raise or lower the blowheads 68 towards or away from the moulds to position the blowheads on the parisons or remove them therefrom. The blowheads 68 are supported on a holder 76 mounted on a piston rod 78 of the assembly 74. Blowing air is supplied to the blowheads 68 through telescopic tubes 80 extending parallel to the piston rod 78 and connecting a source of air 82 on the structure 22 to the blowheads 68.

The section 10 also comprises a take-out mechanism 84 of conventional construction operable to remove completed containers from the bottom plates when the mould side portions 62 move to their mould open conditions. The take-out mechanism 84 is movable between a pick-up position thereof (shown in FIG. 1) over the bottom plates and a release position (not shown) over a dead plate (not shown) of the section 10.

The invert mechanism 16 comprises a neck ring support comprising a shaft 90 (FIG. 4) extending transversely of the section 10 halfway between the parison moulding apparatus 12 and the final moulding apparatus 14. The shaft 90 is mounted on the frame 20 to turn about the axis 18. Telescopically received on the shaft 90 are two neck ring arm supports 92 of the neck ring support. The arm supports 92 are of conventional construction and make spline connections with the shaft 90 so that they can slide along the shaft 90, but when the shaft 90 turns about the axis 18, the supports 92 are constrained to turn also. Thus, the neck ring support is mounted to turn back and forth about the horizontal axis 18 to move parison-gripping neck rings 94 mounted on the supports 92 between the parison moulding apparatus 12 and the final moulding apparatus 14. The neck rings 94 are of conventional construction and each comprise two half rings mounted one on each of two arms 96 which are mounted on the arm supports 92 by means of conventional T-slot connections 98. The arms 96 project parallel to a radius of the shaft 90 but off-set from the axis thereof so that, when the arms 96 are at the parison moulding apparatus 12, the neck rings 94 are beneath the mould side portions 26 whereas, when the arms 96 are at the final moulding apparatus 14, the neck rings 94 are above the mould side portions 62, the transfer from the apparatus 12 to the apparatus 14 being achieved by a turn of approximately 180 degrees about the axis 18.

The arm supports 92 are movable towards or away from one another along the shaft 90 by conventional piston and cylinder assemblies (not shown) incorporated in the supports 92 to move the neck ring halves 94 apart or together to release or grip the neck portion of a parison.

The invert mechanism 16 also comprises drive means operable to turn the neck ring support 92 back and forth about the horizontal axis 18. The drive means comprises gear means secured to an end portion of the shaft 90 of the neck ring support away from the centre-line of the section 10. The gear means comprises a bevel gear 100 (FIG. 4) secured to the end of the shaft 90 and a bevel gear 102 secured to an upper end of a shaft 104 and meshed with the gear 100. The shaft 104 is mounted to turn about its longitudinal axis on bearings 106 mounted on the frame 20. The drive means also comprises servomotor means connected to said gear means by the shaft 104. The servo-motor means comprises an electric servo-motor 108, e.g. a stepper motor, mounted in a basement beneath the base 21 of the frame 20 and connected to the lower end of the shaft 104 by a coupling 110.

Figure 4:
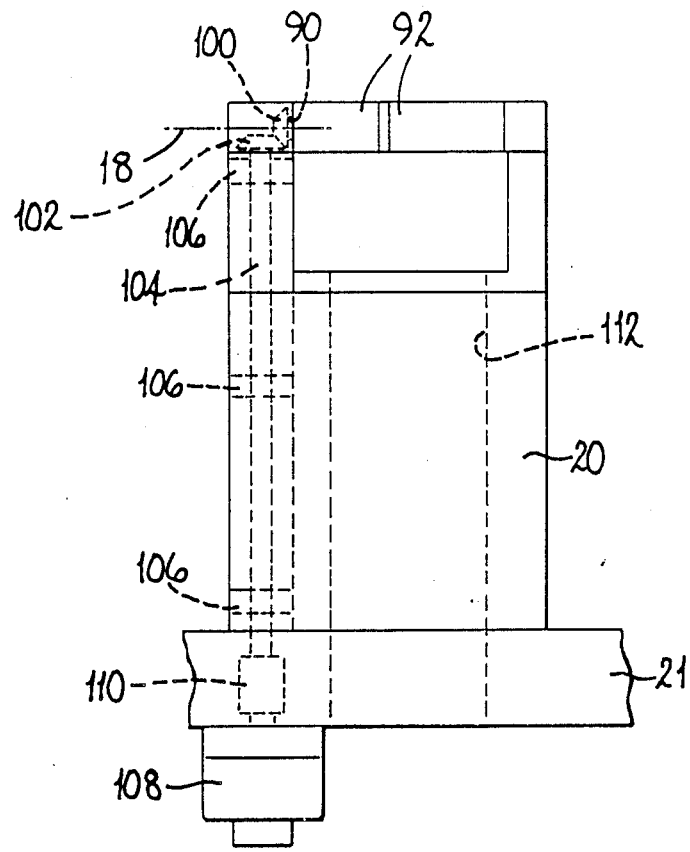
FIG. 4 is a diagrammatic view illustrating the drive means of the invert mechanism of the section.

FIG. 4 shows a cullet chute 112 passing directly through the section 10 to the basement so defective or unwanted parisons can be dropped into the chute 112 instead of being delivered to the final moulding apparatus.

In the operation of the section 10, with the neck rings 94 at the parison moulding apparatus 12, the arms 24 are moved together to complete the mould cavities formed by the mould side portions 26. The funnel mechanism 52 then operates to move the funnels 54 into position on the moulds. Gobs of molten glass are then dropped into the mould cavities through the funnels 54. The gobs fall into the cavities defined partly by the side portions 26 and partly by the neck rings 94 immediately below the portions 26 and rest on the plungers 30 of the plunger mechanism 28.

Next, in the operation of the section 10, if the parisons are to be moulded by pressing, the funnel mechanism 52 removes the funnels 54 from the moulds and the baffle mechanism 32 operates to position baffles 34 on top of the moulds closing the tops of the mould cavities.

The plunger mechanism 28 then presses the plungers 30 into the mould cavities pressing the glass into parisons. The plungers 30 are then withdrawn, the baffles are removed and the arms 24 are moved apart leaving the parisons held by the neck rings 94 and projecting upwardly therefrom.

If the parisons are to be moulded by blowing, the baffle mechanism 32 operates to place the baffles 34 on the funnels 54 on the moulds, settle air is blown through the baffles 34 to force the glass down into the neck rings 94, the baffles 34 are then removed, the funnels 54 are then removed and the baffles 34 replaced on the moulds to close the top of the mould cavities. The plunger mechanism 28 then withdraws its plungers 30 creating bubbles in the glass into which air is blown to expand the glass to the shape of the mould cavity. The baffles 34 are then removed and the arms 24 moved apart leaving the parisons held by the neck rings 94 and projecting upwardly therefrom.

Once the parisons have been formed and the blank moulds have opened, the invert mechanism 16 operates to move the neck rings 94 arcuately carrying the parisons to the final moulding apparatus 14. This motion is accomplished by operation of the motor 108 and can be according to any desired position against time curve. During this motion the parisons are inverted.

Once the parisons have arrived at the final moulding apparatus 14, the arms 60 are moved together enclosing the parisons in a mould cavity defined by two side portions 62 and a bottom plate. The supports 92 are then moved apart opening the neck rings 94 and releasing the parisons. The motor 108 is now operated to return the neck rings 94 to the parison moulding apparatus during which motion the neck rings are closed.

The blowhead mechanism 66 now positions a blowhead 68 on each parison and air is blown into the parisons causing them to expand to the shape of the mould cavity. The blowheads 68 are then removed and the arms 60 moved apart leaving the completed containers on the bottom plates until removed by the take-out mechanism 84.

In the section (10), because the baffle mechanism 32 and the funnel mechanism 52 are removed from the frame 20, because the invert mechanism 16 has no drive means on the centre-line of the section, and because the final moulding apparatus 14 has no hinge pin, it is possible to reduce the mean radius of the invert mechanism 16 below that of conventional machines allowing greater speed of operation, producing a more compact machine, increasing accessibility to mechanisms such as the plunger mechanism 28, and making removal of cullet easier. Furthermore, the relatively short distances which the mould portions 26 and 62 and the carriages 36 and 70 travel also enhance the possibilities of increased speed.

I claim:
1. An individual section glassware forming machine comprising
  an individual section having a blank mold at one side, a blow mold at the other side and a neck ring assembly rotatively displaceable about a horizontal axis located therebetween,
  baffle means associated with said blank mold,
  blowhead means associated with said blow mold and,
  rail means for supporting said baffle means and said blowhead means for linear displacement parallel to said neck ring assembly axis between remote and operative positions.

2. An individual section glassware forming machine according to claim 1, wherein said baffle means includes gob deflector means for guiding gobs when said baffle means is located at said remote position.

* * * * *